US012349832B2

(12) United States Patent
Merati et al.

(10) Patent No.: US 12,349,832 B2
(45) Date of Patent: Jul. 8, 2025

(54) BREWING DEVICE FOR PREPARING BEVERAGES

(71) Applicant: CARIMALI S.P.A., Bergamo (IT)

(72) Inventors: Alessandro Merati, Bergamo (IT); Michele De Nicolo, Concorezzo (IT)

(73) Assignee: CARIMALI S.P.A., Bergamo (IT)

( * ) Notice: Subject to any disclaimer, the term of this patent is extended or adjusted under 35 U.S.C. 154(b) by 960 days.

(21) Appl. No.: 17/417,838

(22) PCT Filed: Dec. 24, 2019

(86) PCT No.: PCT/IB2019/061341
§ 371 (c)(1),
(2) Date: Jun. 24, 2021

(87) PCT Pub. No.: WO2020/136583
PCT Pub. Date: Jul. 2, 2020

(65) Prior Publication Data
US 2022/0125236 A1 Apr. 28, 2022

(30) Foreign Application Priority Data

Dec. 24, 2018 (IT) .......................... 102018000021049
Dec. 28, 2018 (IT) .......................... 102018000021412

(51) Int. Cl.
*A47J 31/46* (2006.01)
*A47J 31/36* (2006.01)

(52) U.S. Cl.
CPC ......... *A47J 31/469* (2018.08); *A47J 31/3614* (2013.01); *A47J 31/3619* (2013.01)

(58) Field of Classification Search
CPC ... A47J 31/469; A47J 31/3614; A47J 31/3619
(Continued)

(56) References Cited

U.S. PATENT DOCUMENTS 5,309,822 A    5/1994  Sager
5,738,002 A *  4/1998  Marano-Ducarne .........
                                               A47J 31/4485
                                               99/323.1
(Continued)

FOREIGN PATENT DOCUMENTS

DE         4240175 C1    12/1993
DE    202006014317 U1     2/2008
(Continued)

OTHER PUBLICATIONS

International Search Report dated Jun. 23, 2020 for PCT Appl. No. PCT/IB2019/061341.
(Continued)

*Primary Examiner* — Thien S Tran
*Assistant Examiner* — Simpson A Chen
(74) *Attorney, Agent, or Firm* — Ruggiero McAllister & McMahon LLC (57) ABSTRACT

A brewing device is used for preparing beverages like coffee or tea. The brewing device includes a brewing chamber with an opening for loading/unloading a brewing material, a piston slidably mounted in the brewing chamber and an electronic control unit. The electronic control unit is programmed to cause the piston to move among a loading configuration, in which the brewing material is loadable in the brewing chamber, a compression configuration, in which the piston compacts the brewing material in the brewing chamber, and an expulsion configuration, in which the piston extracts the exhausted material from the brewing chamber. The electronic control unit is programmed to cause, in the loading configuration, the piston to lower from a higher position, corresponding to an initial loading configuration, to a lower position, corresponding to a final loading configuration.

22 Claims, 5 Drawing Sheets

(58) Field of Classification Search
USPC .................................. 99/289, 302 P, 289 R
See application file for complete search history.

(56) References Cited

U.S. PATENT DOCUMENTS

| | | | |
|---|---|---|---|
| 8,770,092 B2* | 7/2014 | Ruckstuhl | A47J 31/3609 |
| | | | 99/287 |
| 8,776,672 B2 | 7/2014 | Wüthrich | |
| 10,952,561 B2 | 3/2021 | Heuberger | |
| 2007/0169640 A1* | 7/2007 | Sato | A47J 31/3619 |
| | | | 99/495 |
| 2011/0212229 A1* | 9/2011 | McLaughlin | A47J 31/3614 |
| | | | 99/283 |
| 2014/0373724 A1* | 12/2014 | De'Longhi | A47J 31/3619 |
| | | | 99/289 R |
| 2016/0157664 A1* | 6/2016 | Doglioni Majer | A23F 5/262 |
| | | | 426/433 |

FOREIGN PATENT DOCUMENTS

| | | |
|---|---|---|
| DE | 102016002150 A1 | 8/2017 |
| EP | 0536616 A1 | 4/1993 |
| EP | 2055214 A1 | 5/2009 |
| JP | H 05-317184 A | 12/1993 |
| JP | 2008-77622 A | 4/2008 |
| JP | 2012-50528 A | 3/2012 |
| JP | 2016-527969 A | 9/2016 |
| WO | 2009010275 A1 | 1/2009 |
| WO | 2017/144154 A1 | 8/2017 |

OTHER PUBLICATIONS

Written Opinion dated Jun. 23, 2020 for PCT Appl. No. PCT/IB2019/061341.
Second Written Opinion dated Nov. 2, 2020 for PCT Appl. No. PCT/IB2019/061341.
International Preliminary Report on Patentability (IPRP) dated Mar. 23, 2021 for PCT Appl. No. PCT/IB2019/061341.
European Search Report dated Jul. 31, 2023 from corresponding EP Patent Application No. 19 842 412.9, 8 pages.
Japanese Notice of Reasons for Refusal dated Jan. 17, 2025 from corresponding Japanese Patent Application No. 2023-218615, 14 pages.

* cited by examiner

BREWING DEVICE FOR PREPARING BEVERAGES

CROSS REFERENCE TO RELATED APPLICATIONS

This application is a national stage application, filed under 35 U.S.C. § 371, of International Patent Application No. PCT/IB2019/061341, filed on Dec. 24, 2019, which claims priority to Italian Patent Application 102018000021049, filed on Dec. 24, 2018 and Italian Patent Application 102018000021412, filed Dec. 28, 2018, the entire contents of each of which is incorporated by reference herein in its entirety.

BACKGROUND OF THE DISCLOSURE

1. Field of the Disclosure

The present disclosure relates to a brewing device for preparing beverages, in particular coffee or tea, and to an associated automatic brewing process.

2. Description of Related Art

In the field of automatic beverage preparation machines for preparing beverages, in particular coffee-based or tea-based beverages, it is known to use a brewing device comprising a preferably cylindrical-shaped brewing chamber, which is provided with an opening for loading/unloading a brewing material; a lid movable, with respect to the brewing chamber, between an open position and a closed position of said opening; and a piston slidingly arranged in the brewing chamber to be arranged in a loading position, in which it allows a brewing material to be inserted in the brewing chamber through the opening, in a dispensing position, in which cooperates with the lid to fluid-tightly close the brewing chamber and to allow a brewing fluid, normally pressurized hot water, to be fed into the brewing chamber so as to percolate through the material and produce the beverage; and in an unloading position, in which the piston expels the exhausted material from the brewing chamber at the end of the beverage dispensing process.

Generally, in known brewing devices having the above-described structure, the loading position of the piston is a lower end-stroke position, in which the piston is completely set back, normally arranged in contact with the bottom of the brewing chamber, so that the volume available to receive the brewing material corresponds to the maximum volume available in the brewing chamber.

Once the material is loaded, normally automatically by means of a grinding and measuring device, the lid is closed and the piston is raised towards the lid until it stops at a given level, which corresponds to the dispensing position and is predetermined based on the degree of compaction requested for the brewing material to produce the beverage selected by the user.

After the beverage has been dispensed and the lid has been re-opened, the piston is further raised up to the unloading position and subsequently is lowered to bring it back to the initial loading position, waiting for a new operating cycle.

To perform the above-described sequential steps of the process, the brewing device takes a given period of time, called handling time, which, added to the material grinding time and the beverage brewing and dispensing time, forms the so-called cycle time, i.e. the time that the brewing device takes to complete a beverage production cycle. Generally, based to the grinding speed, the characteristics of the brewing device and the type of selected beverage, the cycle time is approximatively 30-50 sec.

Given a same grinding device and a same brewing device, the duration of the cycle time almost exclusively depends on the type of beverage to be produced, i.e., on the brewing and dispensing time required for this beverage. For example, for a "short" beverage, such as espresso coffee, which requires about 35 cc of water, the brewing time is shorter and, therefore, also the cycle time will be shorter; on the other hand, for a "long" beverage, such as long coffee or tea, which requires about 120 cc of water, the brewing time is longer and, therefore, also the cycle time will be proportionally longer.

It follows that, at least for short beverages, which have a very short brewing time, the grinding time and the handling time play a significant role in the total duration of the beverage production cycle.

As it is known, the cycle time is an important parameter for evaluating the performance of a beverage production machine since it influences the ability of the machine to produce beverages in rapid succession and also determines the time that a user must wait before obtaining the selected beverage. This waiting time is generally quite unpleasant for users and this has prompted the manufacturers of beverage preparation machines to look for solutions that allow to shorten the cycle time as much as possible.

A solution is known, for example, from DE 10 2016 002150 A1, which relates to a brewing assembly having a structure of the type described above and in which, to reduce the cycle time, the piston speed is controlled so as to be higher when the piston performs the downward stroke, i.e., from the unloading position to the loading position, and to be lower when the piston, after the loading of the brewing material, moves upward from the loading position to the brewing position to compress the material within the brewing chamber.

WO 2009/010275 A1 discloses a coffee machine infusion group comprising a closure piston and an infusion cylinder subjectable to a reversible roto-translation movement between a position of engagement with the closure piston for the creation of an infusion chamber and a position of disengagement from the closure piston for the loading of a coffee powder load. The infusion group has an expulsion system of the spent coffee powder load from the infusion chamber, comprising an expulsion piston displaceably housed in the infusion cylinder, and mechanical driving means adapted for an interference with the expulsion piston, occurring due to the rotational component of the roto-translation movement, for displacement of the expulsion piston relative to the infusion cylinder.

DE 42 40 175 C1 discloses an infusion equipment for an automatically-operated coffee machine and having an inlet for coffee powder, an infusion chamber, a hot water inlet, and an outlet pipe for brewed coffee. The infusion chamber is fitted with a drive motor which makes possible rotation about a vertical axis a plunger which is also movable vertically by means of a drive motor. The plunger is vertically movable between a lower, charging position for charging the chamber with coffee, an upper brewing position for the preparation of coffee, and a lower cleaning position for removal of coffee residue through a waste pipe. Rotation of the plunger makes possible an even distribution of the coffee powder during loading, and an even concentration of the coffee powder during brewing.

EP 2 055 214 A1 discloses a brewing device for a coffee machine, comprising a brewing cylinder with a cylindrical bore, and upper and lower pistons. The cylinder and the pistons are held in a frame and are driven by a spindle including a trapezoidal thread. A coffee powder feeding device fills a brewing chamber with coffee powder. A stripping element serves to strip off the residual coffee powder that is discharged from the chamber through the lower piston after the brewing process. The spindle is supported by supporting units on a region opposite to a threaded part, where the units are attached to the frame.

EP 0 536 616 A1 discloses an automatic coffee machine comprising a flow heater for preparing hot water, a facility for feeding coffee powder into a percolator, consisting of a percolating chamber formed by a stationary tube section arranged with a vertical axis and two stoppers located at least partly within the flow heater and an axial drive for moving the upper stopper in the direction of the tube section axis, a drive for moving the upper stopper into the parked and stand-by positions relative to said axis, as well as a vertical drive for the lower stopper. The upper stopper is mounted on a pivot arm which can be pivoted about a bearing which is fixed in position. The drive for moving the upper stopper into the parked and stand-by positions is an actuator. The upper stopper is constructed in one piece and can be moved in a sealing manner into the tube section, by means of the axial drive which is mounted on the pivot arm, to achieve the percolating position.

DE 20 2006 014317 U1 discloses a coffee machine comprising a brewing unit connected to a heat water inlet and with a brewing chamber receiving grinding coffee powder during brewing process of grinding coffee powder. A crema valve is actuated in a coffee outlet line. A pump discharges heat water that is supplied to the brewing unit. An output of the pump is provided for preparing an espresso coffee. A flow rate measuring device measures counter pressure counteracting the heat water supplied to the brewing chamber by the coffee powder present in the brewing chamber.

BRIEF SUMMARY OF THE DISCLOSURE

The purpose of the present disclosure is providing a brewing device of the type described above, which offers an effective, simple, and inexpensive solution to the problem of reducing the beverage preparation cycle time.

According to the present disclosure, a brewing device, a beverage preparation machine comprising said brewing device, and the associated automatic brewing process are provided, as claimed in the appended claims.

DETAILED DESCRIPTION OF THE DISCLOSURE

The present disclosure will now be described in detail with reference to the attached figures to allow a person skilled in the art to produce and use it. Various modifications to the described embodiments will be immediately evident to the person skilled in the art and the generic principles described can be applied to other embodiments and applications without thereby departing from the scope of the present disclosure, as defined in the attached claims. Therefore, the present disclosure should not be considered limited to the described and illustrated embodiments, but it should afford the widest scope of protection according to the principles and characteristics described and claimed herein.

Figure 1:
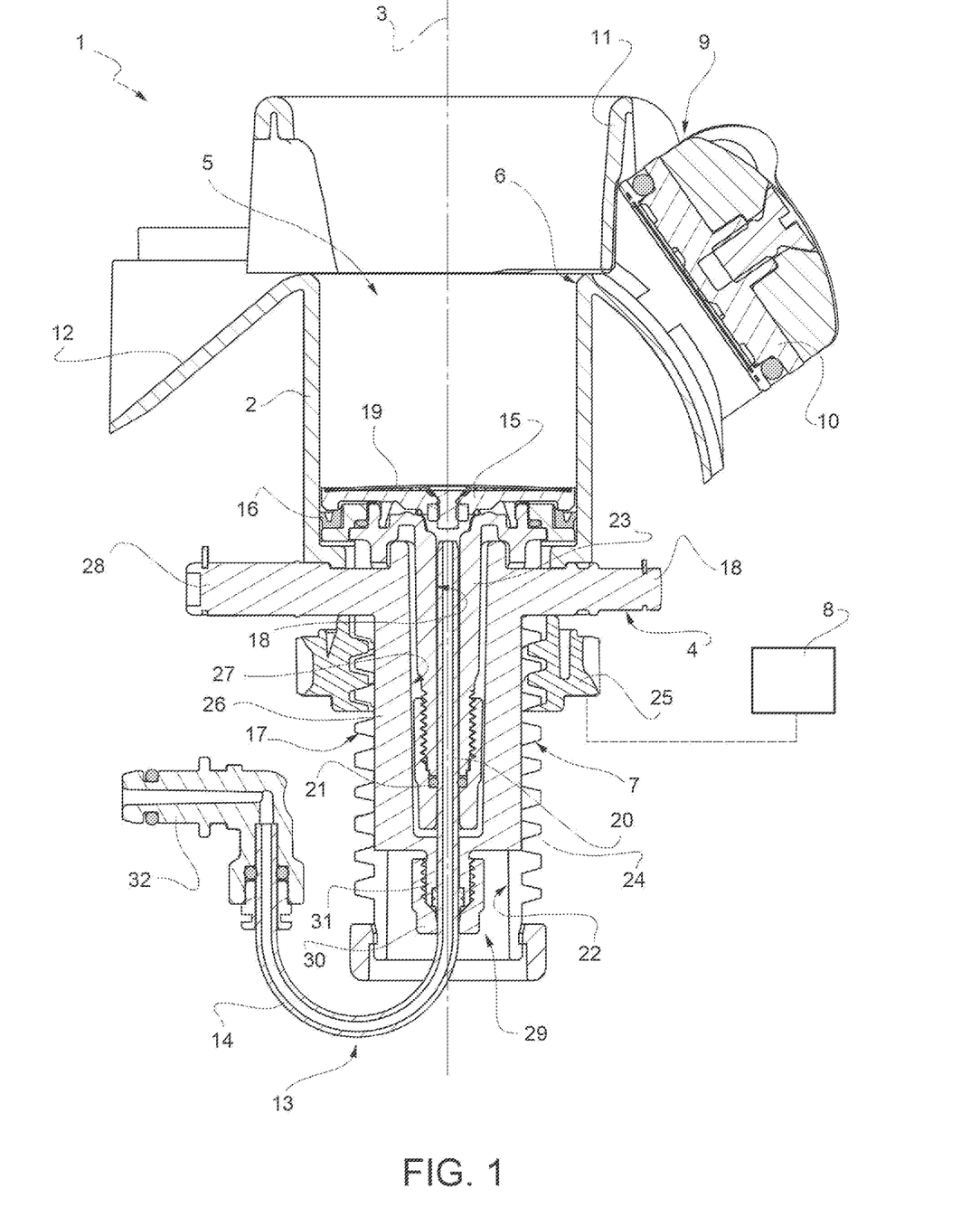
FIG. 1 shows a cross-section along a longitudinal plane, a brewing device according to the preferred embodiment of the present disclosure.

FIG. 1 shows a brewing device for preparing beverages, in particular coffee or tea, by causing a given quantity of ground or leaf-like material to be brewed by pressurized hot water.

During normal operation, the brewing device 1 is arranged in a beverage preparation machine and is associated with a source of pressurized hot water and with a grinding device (known and not shown) operable to supply the brewing device 1, at the beginning of each beverage production cycle, with a weighted quantity of brewing material, for example ground coffee or leaf tea.

FIG. 1 shows a brewing device in a zero configuration which is assumed when the beverage preparation machine is turned off.

As shown in FIG. 1, the brewing device 1 comprises a tubular body 2, preferably cylindrical-shaped, with a longitudinal axis 3 and stationarily supported by a frame 4 of the brewing device 1. Preferably, the tubular body 2 is housed between two shells (not shown), which are part of the frame 4 and integral with one another, conveniently removably, so as to form an outer box-like casing.

Internally, the tubular body 2 delimits a brewing chamber 5, in which, during operation, the brewing material and pressurized hot water are successively supplied so that the brewing process can take place.

The brewing chamber 5 has, at one end, an opening 6 designed to allow the loading of the brewing material and the emptying of the brewing chamber at the end of the beverage dispensing, and, at an opposite end, the brewing chamber 5 is delimited by a piston 7 having the function of compressing the brewing material in the brewing chamber 5 before injecting water and of expelling the compressed exhausted material from the brewing chamber 5 at the end of the beverage dispensing.

For this purpose, the piston 7 is associated with an actuator (not shown) controlled by an electronic control unit 8 designed to cause the piston 7 to move along the longitudinal axis 3 according to a given operating sequence, which will be described in detail in the following, and in which the piston 7 successively assumes a loading configuration, in which the brewing material is introduced in the brewing chamber 5 (FIGS. 2 and 3), a compression configuration (FIG. 4), in which the piston 7 compresses the brewing material previously introduced in the brewing chamber 5, and an expulsion configuration (FIG. 5), in which the piston 7 is raised up to the opening 6 so as to extract the compressed exhausted material from the brewing chamber 5 and cause expulsion thereof.

The brewing device 1 further comprises a lid 9 movable between a closed or dispensing position (FIG. 2), in which the lid 9 fluidtightly closes the opening 6, and an open position, in which the lid 9 leaves the opening 6 free so as to allow, at the beginning of a beverage production cycle, the loading of the brewing material in the brewing chamber 5 and, at the end of the beverage production cycle, the extraction of the compressed exhausted material from the brewing chamber 5 for the subsequent expulsion of the same.

In greater detail, the lid 9 is formed by a closing body 10, which is provided with a gasket to seal the opening 6 when the lid 9 is in the closed position, and by a scraper 11, which is hinged to the closing body 10 and is configured to move on the opening 6, after the piston 7 has reached the expulsion configuration, so as to push the exhausted material arranged on the piston 7 onto a chute 12 connected to the top of the tubular body 2 to cause the exhausted material to drop into an underlying collection container (not illustrated).

An outlet duct (not shown) is formed in the closing body 10 to allow the outflow of the beverage produced by brewing the brewing material by means of a brewing fluid supplied to the brewing chamber 5 through the piston 7.

In particular, the pressurized fluid coming from an external source, for example a tank or water mains, is supplied to the brewing chamber 5 through a brewing fluid supply line 13, which is partly formed in the piston 7 and further comprises a supply tube 14 arranged between the piston 7 and the external source.

As shown in FIG. 1, the piston 7 comprises a head 15, which slidably engages, with the interposition of a gasket 16, an inner surface of the brewing chamber 5, and a stem 17 which is integral with the head 15 and extends, coaxially to the longitudinal axis 3, from the head 15 towards the outside of the brewing chamber 5.

The head 15 is made as a shower head with one or more through-holes (not shown) that put the brewing chamber 5 in fluidic communication with a brewing fluid supply channel 18 which is formed in the stem 17 and is part of the supply brewing fluid line 13. On the face of the head 15 facing the brewing chamber 5, a filter 19, conveniently in the form of a disk of wire mesh, is provided to prevent, during operation, the brewing material from obstructing the inlet(s) of the through-hole(s) in the head 15.

Preferably, the channel 18 is coaxial with the longitudinal axis 3 and is formed to receive, during operation, the brewing fluid from the supply tube 14, which is stationary relative to the brewing chamber 5 and comprises a fluid outflow end portion 20, which is coaxial with the longitudinal axis 3 and is slidably coupled to the piston 7 so as to cause, during operation, the piston 7 to slide on the supply tube 14 during movement along the longitudinal axis 3.

Preferably, the end portion 20 of the supply tube 14 is inserted within the channel 18. In an alternative embodiment not shown, the end portion 20 slidably engages the piston 7 on the outside.

In order to seal-off the channel 18 on the outside so as to cause all the brewing fluid supplied by the supply tube 14 to the channel 18 to reach the brewing chamber 5, so preventing the brewing fluid from dripping from the piston 7, a dynamic seal element 21 is provided between the channel 18 and the supply tube 14. Preferably, the dynamic seal element 21 is in the form of a ring-like seal housed in a seat which is coaxial with the longitudinal axis 3 and is formed in the stem 17.

Preferably, as shown in the attached F, the stem 17 of the piston 7 has an inner cavity 22, which divides the stem 17 in a central portion 23, in which the channel 18 is formed, and in a tubular peripheral portion 24, which is integral, as well as the central portion 23, with the head 15. The peripheral portion 24 has, on an outer lateral surface, a thread meshing with a toothed wheel 25, which is part of the actuator 8 and is operable to move the stem 17, and, hence, the piston 7, along the longitudinal axis 3.

The cavity 22 is engaged by a stationary tubular body 26, which is part of the frame 4 and acts as an axial support and guide for the piston 7. In particular, the tubular body 26 has an axial hole 27 having an upper larger portion slidably engaged by the central portion 23 of the stem 17 and a lower narrower portion through which the end portion 20 of the supply tube 14 stationarily extends.

The tubular body 26 further comprises two diametrically opposite transverse appendages 28, which slidably engage associated longitudinal slits of the stem 17.

The brewing device 1 further comprises a fastening device 29 to fasten the supply tube 14 to the frame 4.

Preferably, the fastening device 29 comprises a pipe-locking threaded collar 30 which is pressure-fitted onto the supply tube 14 and is removably screwed onto a threaded sleeve 31 coaxial with the hole 27 and integral with the tubular body 26, so as to make the supply tube 14 integral with the tubular body 26 and, hence, with the frame 4.

The supply tube 14 can be made of any material suitable for the purpose, in particular a material which facilitates sliding. Preferably, the supply tube 14 is made of a rigid or semi-rigid polymeric material, for example Teflon.

The supply tube 14 may have, between the fastening device 29 and the external source, any shape suitable for the space available inside the beverage preparation machine. In the example shown, downstream of the fastening device 29, the supply tube 14 exits from the bottom of the cavity 22 of the stem 17 and extends up to a fitting 32 that connects, directly or indirectly, the free end of the supply tube 14 to the external source of brewing fluid.

Operation of the brewing device 1 will now be described with reference to FIGS. 1 to 5, of which FIGS. 2-5 represent the salient steps of a production cycle.

As previously mentioned, in FIG. 1 the brewing device 1 is shown in a zero configuration, which is assumed when the beverage preparation machine is turned off. In this condition, the piston 7 can be arranged in any position inside the brewing chamber 5, but, preferably, it is arranged at the bottom dead point, i.e., completely set back on the bottom of the brewing chamber 5. Normally, in the zero condition, the lid 9 is in the open position.

When the beverage preparation machine is turned on, the electronic control unit 8 is programmed to control the actuator to cause the piston 7 to be arranged in the loading configuration, in which the piston 7 is ready to receive the brewing material supplied by the grinding device (not shown) through the opening 6. In this regard, it is to be pointed out that the loading configuration of the piston 7 is not meant to indicate a single position of the piston 7, but rather the predisposition of the piston 7 in said configuration to receive the brewing material that is loaded into the brewing chamber 5.

Figure 2:
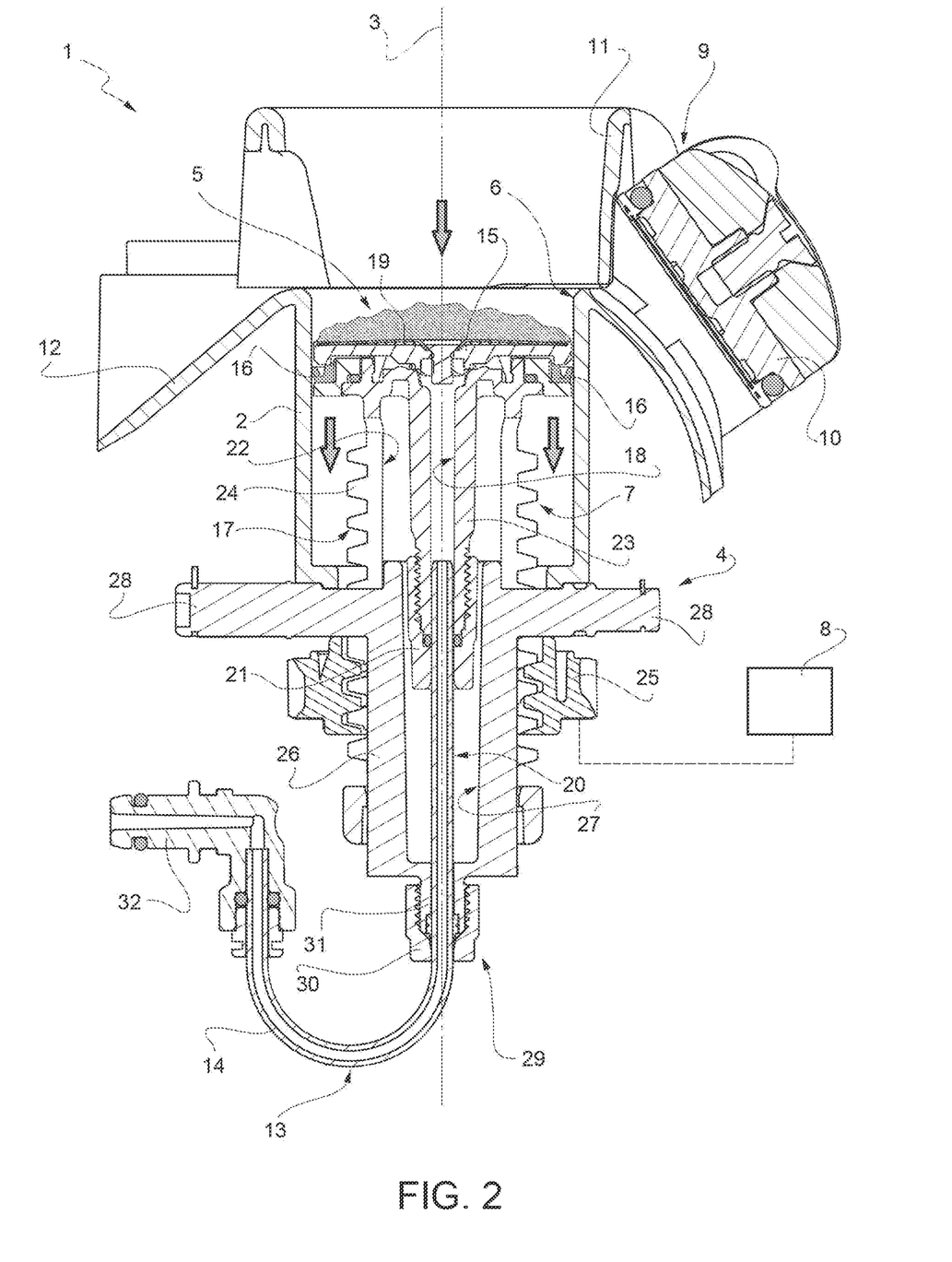
FIGS. 2 to 5 shows the brewing assembly of FIG. 1 in respective operating configurations corresponding to sequential steps of a beverage production cycle.

In other words, in the context of the present disclosure, the expression "loading configuration" is meant to indicate a plurality of consecutive loading positions or, better yet, a variable loading position, in which the piston 7 is lowered, along the longitudinal axis 3, from a higher height or position, which is pre-set and normally, but not necessarily, is the same for all the selected beverages, to a lower position or height, which conveniently, but not necessarily, depends on the selected beverage and, resultingly, on the quantity of material required to be supplied to the brewing chamber 5 to produce the selected beverage. As shown in FIG. 2, in the loading configuration at a higher position, hereinafter referred to as the initial loading configuration, the piston 7 is almost completely extracted and occupies a position slightly lower than the expulsion configuration, in which the top of the head 15 is substantially coplanar with the opening 6.

The initial loading configuration is preferably a stand-by configuration, which the piston 7 assumes at the end of each beverage production cycle, before the beginning of a new production cycle.

In response to a beverage selection by a user, the grinding device (not shown), under the control of the electronic control unit 8, is turned on for a given period of time in order to grind a pre-set quantity of material based on the type of beverage selected. Alternatively, the amount of material is not obtained by controlling the start time of the grinding device, but by means of other known systems, for example by weighing the brewing material, preferably before grinding.

During grinding, the ground material falls into the brewing chamber 5, above the piston 7.

Figure 3:
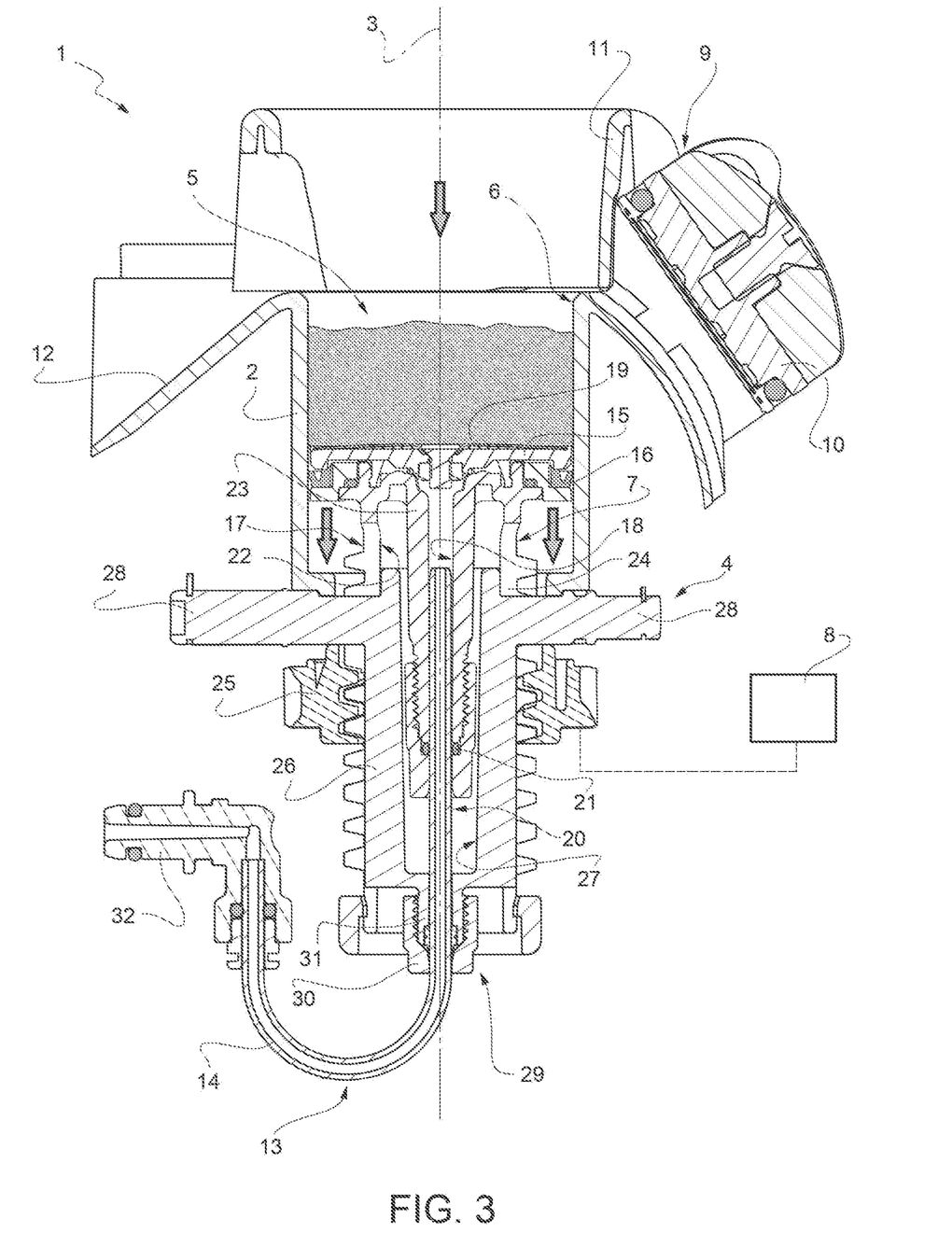

In a preferred embodiment, in fact, the electronic control unit 8 is programmed to control the actuator of the piston 7 to progressively lower the piston 7 during supply of the brewing material in the brewing chamber 5 and stop the piston 7 in the loading configuration at a lower position, hereinafter referred to as final loading configuration, as soon as the grinding device is stopped and then the supply of the material in the brewing chamber 5 ends (FIG. 3). The longer the grinding step lasts, the more the piston 7 is lowered, thus expanding the brewing chamber 5.

Figure 4:
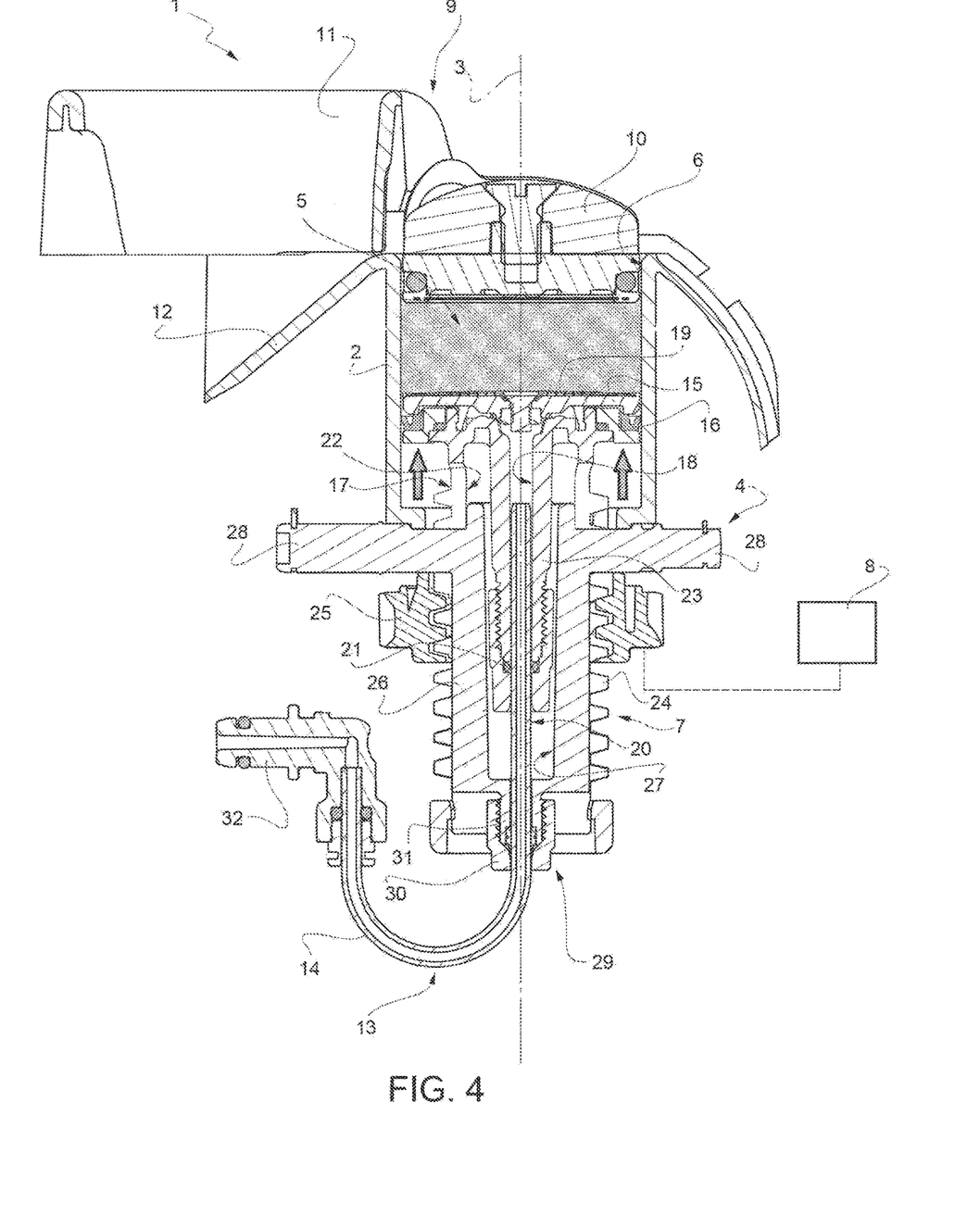

As shown in FIG. 4, at this point the electronic control unit 8 is programmed to move the lid 9 in the closed position so as to seal the brewing chamber 5 and to lift the piston 7 from the final loading configuration, until it assumes the compression configuration. The length of the stroke of the piston 7, between the final loading configuration and the compression configuration, is computed by the electronic control unit 8 based on the selected beverage and, therefore, on the relative compaction degree required to produce the selected beverage.

In some cases, where compaction of the material is not required, the piston 7 is not raised and, therefore, the final loading configuration and the compression configuration coincide.

Following the supply of a given quantity of pressurized hot water through the supply line 13, the beverage is produced and flows out of the brewing chamber 5 through an outflow duct (not shown) formed in the lid 9. Alternatively, the outflow duct is formed in a component of the brewing device 1 other than the lid 9, for example through the piston 7.

Figure 5:
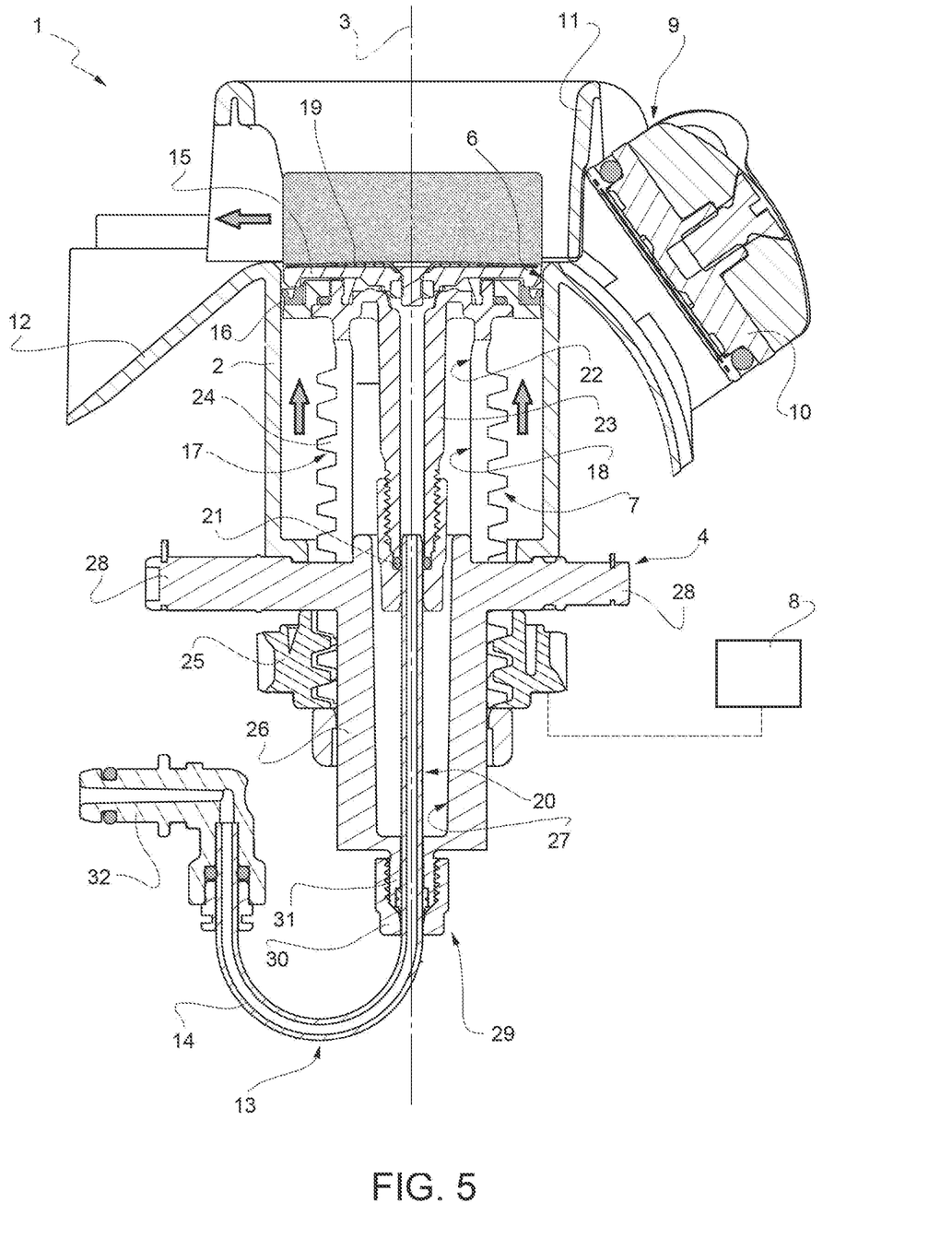

At this point, as shown in FIG. 5, the electronic control unit 8 is programmed to move the lid 9 to the open position and to lift the piston 7 up to the expulsion configuration. A subsequent round-trip movement of the lid 9 towards the closed position causes the scraper 11 to expel the compressed exhausted material.

The beverage production operating cycle ends with the return of the piston 7 to the initial loading configuration.

In an alternative embodiment (not shown) of the above-described process, the piston 7 is not lowered from the initial loading configuration to the final loading configuration simultaneously with the feeding of the material in the brewing chamber 5, but when the beverage is selected, i.e., before the brewing material is loaded in the brewing chamber 5.

In fact, in both processes, the final loading configuration is computed by the electronic control unit 8 based on data stored in a table and indicative of predetermined final loading and compression configurations associated with the selectable beverages.

Furthermore, in an alternative embodiment (not shown), which is preferably applicable when the movement of the piston 7 from the initial loading configuration to the final loading configuration occurs before the supply of the brewing material to the brewing chamber 5, the initial loading configuration coincides with the expulsion configuration, where the top of the head 15 of the piston 7 is arranged at the level of the opening 6.

As a conclusion to what has been described above, it is appropriate to highlight the various advantages offered by the above-described process, which are connected to the fact that the loading configuration of the piston 7 is not a fixed position, in which the maximum available volume of the brewing chamber 5 receives the brewing material, but it is a variable configuration, in which the volume intended to receive the brewing material is enlarged from a minimum size (initial loading configuration) to a maximum size (final loading configuration) depending on the quantity of brewing material to be introduced in the brewing chamber 5.

Compared to known processes, the process of the present disclosure allows the cycle time to be shortened as a result of the speeding up of the compression step of the brewing material. In fact, especially when "short" beverages are to be prepared, i.e., beverages that require a smaller quantity of brewing material, it is not necessary to raise the piston 7 from a much lower position than the one in the compression configuration. Moreover, since the final loading configuration is very close to the compression configuration, in some cases the compression step of the brewing material can even be excluded.

Furthermore, when the movement of the piston 7 from the initial loading configuration to the final loading configuration is simultaneous with the supply of the brewing material in the brewing chamber 5, there is the further advantage of a better distribution of the brewing material inside the brewing chamber 5 due to the fact that the falling of brewing material in the brewing chamber 5 is accompanied by the progressive descent of the piston 7. A uniform distribution of the brewing material inside the brewing chamber 5 has the advantage of favouring uniform compaction of the brewing material in the subsequent step of compression of the brewing material by the piston 7 and, consequently, favour a homogeneous distribution of the water and thus impregnation of the brewing material in the subsequent brewing step.

The invention claimed is:

1. A brewing device for preparing beverages, the brewing device comprising:
 a brewing chamber having a tubular body extending along a longitudinal axis thereof, the brewing chamber delimited by an opening for loading/unloading a brewing material at one end and a piston slidably mounted in the brewing chamber at an end opposite the one end,
 wherein the tubular body is stationarily supported by a frame of the brewing device;
 an electronic control unit that controls movement of the piston to cause the piston to move along the longitudinal axis among a loading configuration, in which the brewing material is loadable in the brewing chamber, a compression configuration, in which the brewing material is compacted by the piston in the brewing chamber, and an expulsion configuration, in which exhausted brewing material is extracted from the brewing chamber,
 wherein the loading configuration comprises a higher position in the tubular body corresponding to an initial loading configuration and a lower piston position in the tubular body corresponding to a final loading configuration, wherein the electronic control unit is programmed to cause, in the loading configuration, the piston to be lowered from the higher position to the lower position, wherein, in the initial loading configuration, the piston is in a position lower than the expulsion configuration in which the top of the piston is substantially coplanar with the opening of the brewing chamber, and wherein the electronic control unit is programmed to set the final loading configuration based on the beverage to be prepared and/or a quantity of brewing material to be loaded in the brewing chamber.

2. The brewing device of claim 1, wherein the electronic control unit is further programmed to cause the piston to be lowered from the initial loading configuration to the final loading configuration during the loading of the brewing material in the brewing chamber.

3. The brewing device of claim 1, wherein the electronic control unit is further programmed to cause the piston to be lowered from the initial loading configuration to the final loading configuration before the loading of the brewing material in the brewing chamber.

4. A brewing device for preparing beverages, the brewing device comprising:
a brewing chamber having a tubular body extending along a longitudinal axis thereof, the brewing chamber delimited by an opening for loading/unloading a brewing material at one end and a piston slidably mounted in the brewing chamber at an end opposite the one end,
wherein the tubular body is stationarily supported by a frame of the brewing device; and
an electronic control unit that controls movement of the piston to cause the piston to move along the longitudinal axis among a loading configuration, in which the brewing material is loadable in the brewing chamber, a compression configuration, in which the brewing material is compacted by the piston in the brewing chamber, and an expulsion configuration, in which exhausted brewing material is extracted from the brewing chamber,
wherein the electronic control unit is programmed to cause, in the loading configuration, the piston to lower from a higher position, corresponding to an initial loading configuration, to a lower position, corresponding to a final loading configuration, during the loading of the brewing material in the brewing chamber.

5. The brewing device of claim 4, wherein the electronic control unit is further programmed to set the final loading configuration based on the beverage to be prepared and/or a quantity of brewing material to be loaded in the brewing chamber.

6. The brewing device of claim 1, wherein the piston is arranged at the opening of the brewing chamber in the initial loading configuration.

7. The brewing device of claim 1, wherein the initial loading configuration is a stand-by configuration assumed by the piston at the end of a beverage production cycle and before the beginning of a new beverage production cycle.

8. The brewing device of claim 1, wherein the electronic control unit is further programmed to cause the piston to assume the compression configuration at the end of the loading of the brewing material so that the piston is either maintained in the same position or brought to a higher position than assumed in the final loading configuration, based on the brewing material compaction degree required to prepare the selected beverage.

9. A brewing device for preparing beverages, the brewing device comprising:
a brewing chamber having a tubular body extending along a longitudinal axis thereof, the brewing chamber delimited by having an opening for loading/unloading a brewing material at one end and a piston slidably mounted along the longitudinal axis in the brewing chamber at an end opposite the one end;
an electronic control unit that controls movement of the piston to cause the piston to move among a loading configuration, in which the brewing material is loadable in the brewing chamber, a compression configuration, in which the piston compacts the brewing material in the brewing chamber, and an expulsion configuration, in which the piston extracts the exhausted material from the brewing chamber,
wherein the electronic control unit is programmed to cause, in the loading configuration, the piston to lower from a higher position to a lower position relative to the higher position along the longitudinal axis,
wherein the higher position corresponds to an initial loading configuration and the lower position corresponds to a final loading configuration; and
a brewing fluid supply line that supplies a brewing fluid to the brewing chamber, the brewing fluid supply line comprising a channel formed in the piston that is fluidly connected to the brewing chamber, and a supply tube coupled to the piston that supplies the brewing fluid to the channel,
wherein the supply tube has at least a fluid outflow portion that is coaxial with the channel, and the piston is mounted to slide relative to the supply tube during the movements among the loading configuration, the compression configuration, and the expulsion configuration.

10. The brewing device of claim 9, wherein the supply tube is mounted stationarily relative to the brewing chamber.

11. The brewing device of claim 9, wherein the supply tube is arranged in the channel.

12. The brewing device of claim 9, further comprising a dynamic sealing member arranged between the supply tube and the channel, the dynamic sealing member comprising an O-ring fitted to the piston.

13. The brewing device of claim 9, wherein the piston comprises:
a piston head that is mounted to slidably and fluid-tightly engage a lateral surface of the brewing chamber; and
a stem extending from the piston head out of the brewing chamber,
wherein the channel is formed as an axial hole of the stem having an end slidably and fluid-tightly engaged by the supply tube and another end fluidly connected to the brewing chamber via one or more through passages formed in the piston head.

14. The brewing device of claim 13, wherein the brewing chamber has a longitudinal axis along which the piston slides,
wherein the stem, the channel, and the fluid outflow portion of the supply tube are mounted coaxially with the longitudinal axis.

15. The brewing device of claim 14, further comprising a stationary body configured to support and axially guide the piston along the longitudinal axis,
wherein the stationary body has an axial hole having a larger portion slidably engaged by the stem and a narrower portion through which the fluid outflow portion of the supply tube extends stationarily.

16. The brewing device of claim 15, further comprising a fastening device to removably fasten the supply tube to the stationary body.

17. The brewing device of claim 16, wherein the fastening device comprises a clip threaded bushing that is pressure fitted to the supply tube and is removably screwed on a threaded tubular member integral with the stationary body and coaxial with the axial hole of the stem.

18. A beverage preparation machine comprising the brewing device of claim 1.

19. A method for preparing beverages with a brewing device comprising a brewing chamber having a tubular body extending along a longitudinal axis thereof delimited by an opening for loading/unloading a brewing material at one end, and a piston slidably mounted in the brewing chamber at an end opposite the one end, wherein the tubular body is stationarily supported by a frame of the brewing device, wherein the piston is moveable among a loading configuration, in which the brewing material is loadable in the brewing chamber, a compression configuration, in which the brewing material is compactable by the piston in the brewing chamber, and an expulsion configuration, in which exhausted brewing material is extractable from the brewing chamber, the method comprising:
  setting a final position of the loading configuration based on the type of beverage to be prepared and/or a quantity of brewing material to be loaded in the brewing chamber; and
  controlling, by an electronic control unit, the piston to cause the piston to move along the longitudinal axis from an initial position of the loading configuration to the final position,
  wherein the higher position corresponds to the initial position and the lower position corresponds to the final position.

20. A method for preparing beverages with a brewing device comprising a brewing chamber having a tubular body extending along a longitudinal axis thereof delimited by an opening for loading/unloading a brewing material at one end, and a piston slidably mounted in the brewing chamber at an end opposite the one end, wherein the piston is moveable among a loading configuration, in which the brewing material is loadable in the brewing chamber, a compression configuration, in which the brewing material is compactable by the piston in the brewing chamber, and an expulsion configuration, in which exhausted brewing material is extractable from the brewing chamber, the method comprising:
  loading brewing material into the brewing chamber; and
  controlling, by an electronic control unit, the piston to cause the piston to be lowered from an initial position of the loading configuration to a final position of the loading configuration, thereby enlarging the brewing chamber,
  wherein the piston is lowered from the initial position to the final position while the brewing material is loaded into the brewing chamber.

21. A beverage preparation machine comprising the brewing device of claim 4.

22. A beverage preparation machine comprising the brewing device of claim 9.

* * * * *